(12) United States Patent
Haynes et al.

(10) Patent No.: US 9,866,369 B1
(45) Date of Patent: Jan. 9, 2018

(54) INFRARED BEACON AND CONTROLLING METHOD OF SAME

(71) Applicant: CEJAY ENGINEERING, LLC, Bonita Springs, FL (US)

(72) Inventors: Derek Haynes, Bonita Springs, FL (US); Guido Albert Lemke, Hopewell Junction, NY (US); Mark Haynes, Nashua, NH (US)

(73) Assignee: Cejay Engineering, LLC, Bonita Springs, FL (US)

( * ) Notice: Subject to any disclaimer, the term of this patent is extended or adjusted under 35 U.S.C. 154(b) by 0 days.

(21) Appl. No.: 15/239,963

(22) Filed: Aug. 18, 2016

(51) Int. Cl.
| | | |
|---|---|---|
| H04B 10/00 | (2013.01) |
| H04L 7/00 | (2006.01) |
| H04B 10/11 | (2013.01) |
| H04L 7/04 | (2006.01) |

(52) U.S. Cl.
CPC ............ *H04L 7/0075* (2013.01); *H04B 10/11* (2013.01); *H04L 7/0037* (2013.01); *H04L 7/041* (2013.01)

(58) Field of Classification Search
CPC ..... H04L 7/0075; H04L 7/0037; H04L 7/041; H04B 10/11
See application file for complete search history.

(56) References Cited

U.S. PATENT DOCUMENTS

| | | | | | |
|---|---|---|---|---|---|
| 4,131,942 | A | * | 12/1978 | Gillett | G06F 1/28 714/22 |
| 4,131,944 | A | * | 12/1978 | Mager | G06F 13/285 710/107 |
| 6,970,183 | B1 | * | 11/2005 | Monroe | G08B 7/062 348/143 |
| 7,456,754 | B1 | * | 11/2008 | Haynes | F21V 23/00 340/815.4 |
| 8,340,345 | B2 | * | 12/2012 | Haynes | G01S 13/78 382/100 |
| 9,581,684 | B2 | * | 2/2017 | Lewis | G01S 17/10 |
| 2003/0200495 | A1 | * | 10/2003 | Kohno | G01B 31/31855 714/728 |
| 2013/0254728 | A1 | * | 9/2013 | Hatae | G06F 17/5045 716/108 |
| 2014/0003824 | A1 | * | 1/2014 | Sun | H04B 10/25073 398/202 |
| 2015/0008843 | A1 | * | 1/2015 | Haynes | F21V 23/00 315/291 |

(Continued)

*Primary Examiner* — Danny Leung
(74) *Attorney, Agent, or Firm* — Finnegan, Henderson, Farabow, Garrett & Dunner, LLP

(57) ABSTRACT

A beacon includes an infrared emitter configured to emit beacon signals; an infrared-link emitter configured to emit infrared-link signals having a wavelength different from that of the beacon signals; an infrared-link detector configured to detect infrared-link signals; a memory configured to store a delay time; a clock configured to generate a clock cycle signal; and a microcontroller configured to, in response to receiving an infrared-link signal including a signaling code and clock synchronization data from an external beacon: adjust the clock to be synchronized with a clock of the external beacon; store the signaling code in the memory; and when the clock cycle signal generated by the clock indicates that it is a starting time of a clock cycle period, control the infrared emitter to emit a beacon signal including the signaling code with the delay time relative to the starting time of the clock cycle period.

20 Claims, 11 Drawing Sheets

(56) References Cited

U.S. PATENT DOCUMENTS

2016/0165409 A1* 6/2016 Bulut .................. G06F 1/163
                                                    715/734
2016/0272287 A1* 9/2016 Covelli ................ B63B 45/04

* cited by examiner

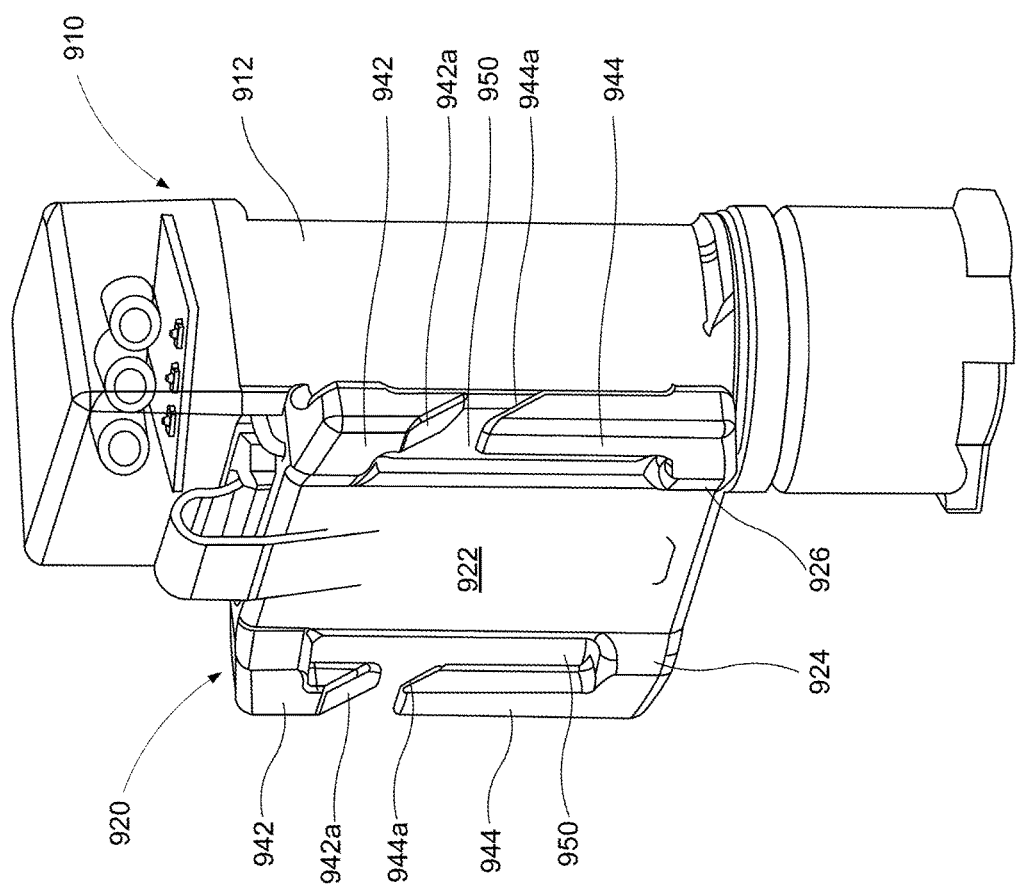

INFRARED BEACON AND CONTROLLING METHOD OF SAME

FIELD OF THE DISCLOSURE

The present disclosure relates to an infrared beacon and a method of controlling the infrared beacon.

BACKGROUND

The inability of reconnaissance to distinguish between friend or foe in low light or total darkness is a major failing of battlefield and law enforcement operations. In these types of lighting conditions, not only does the probability of fratricide (the inadvertent killing of friendly forces by other friendly forces) increase, but time and resources are wasted during attempts to confirm identification. Furthermore, during the heat of battle, mistakes in identification are more likely to occur. Accordingly, there is a need to facilitate effortless and accurate nighttime identification and classification of a distant target or location by a remote sensor.

To this end, beacons have been used in conjunction with night vision equipment including light-intensifying systems that operate by amplifying visible and near infrared light. Beacons emit unique flashing infrared or thermal signatures referred to as signaling programs that are distinguished from operational surroundings by means of intense concentrated energy pulses. Although invisible to the naked eye, signaling programs emitted by beacons can be seen through fog, smoke, and darkness when viewed through night vision or thermal imaging (FLIR) observation devices.

SUMMARY

According to a first aspect of embodiments of the present disclosure, a beacon includes an infrared emitter configured to emit beacon signals; an infrared-link emitter configured to emit infrared-link signals having a wavelength different from that of the beacon signals emitted by the infrared emitter; an infrared-link detector configured to detect infrared-link signals; a memory configured to store a delay time; a clock configured to generate a clock cycle signal; and a microcontroller. The microcontroller is configured to, in response to receiving an infrared-link signal including a signaling code and clock synchronization data from an external beacon via the infrared-link detector: adjust the clock to be synchronized with a clock of the external beacon, according to the clock synchronization data; store the signaling code in the memory; and when the clock cycle signal generated by the clock indicates that it is a starting time of a clock cycle period, control the infrared emitter to emit a beacon signal including the signaling code with the delay time relative to the starting time of the clock cycle period.

According to a second aspect of embodiments of the present disclosure, a method for controlling a beacon includes: detecting, by an infrared-link detector of the beacon, an infrared-link signal transmitted from an external beacon, the infrared-link signal including a signaling code and clock synchronization data; adjusting, by a microcontroller of the beacon, a clock of the beacon to be synchronized with a clock of the external beacon according to the clock synchronization data; storing, by the microcontroller of the beacon, the signaling code in a memory of the beacon; and when a clock cycle signal generated by the clock indicates that it is a starting time of a clock cycle, controlling, by the microcontroller of the beacon, an infrared emitter to emit a beacon signal including the signaling code with a delay time relative to the starting time of the clock cycle, the delay time being stored in the memory of the beacon.

According to a third aspect of embodiments of the present disclosure, a beacon system includes a plurality of beacons for emitting cascading beacon signals with an identical signaling code. Each of the beacons includes: an infrared emitter configured to emit beacon signals; an infrared-link emitter configured to emit infrared-link signals having a wavelength different from that of the beacon signals emitted by the infrared emitter; an infrared-link detector configured to detect infrared-link signals; a memory configured to store a delay time; a clock configured to generate a clock cycle signal; and a microcontroller configured to, in response to receiving an infrared-link signal including a signaling code and clock synchronization data from an external beacon via the infrared-link detector: adjust the clock to be synchronized with a clock of the external beacon, according to the clock synchronization data; store the signaling code in the memory; and when the clock cycle signal generated by the clock indicates that it is a starting time of a clock cycle period, control the infrared emitter to emit a beacon signal including the signaling code with the delay time relative to the starting time of the clock cycle period.

The accompanying drawings, which are incorporated in and constitute a part of this application, illustrate disclosed embodiments and, together with the description, serve to explain the disclosed embodiments.

BRIEF DESCRIPTION OF THE DRAWINGS

FIG. 9A is a perspective view showing a beacon and an attachment mount for mounting the beacon to a MOLLE system, according to an illustrated embodiment.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Figure 1A:
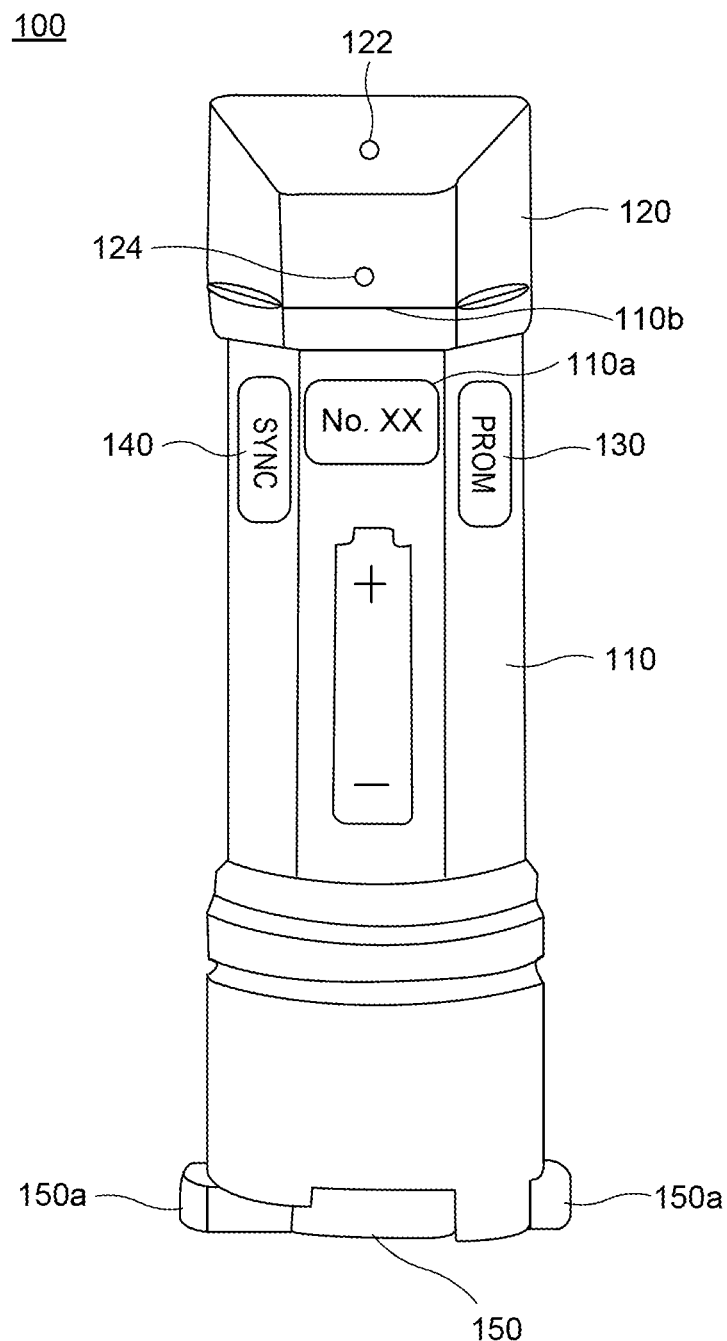
FIG. 1A is a perspective view showing a physical structure of an infrared (IR) beacon according to an illustrated embodiment.
Figure 1B:
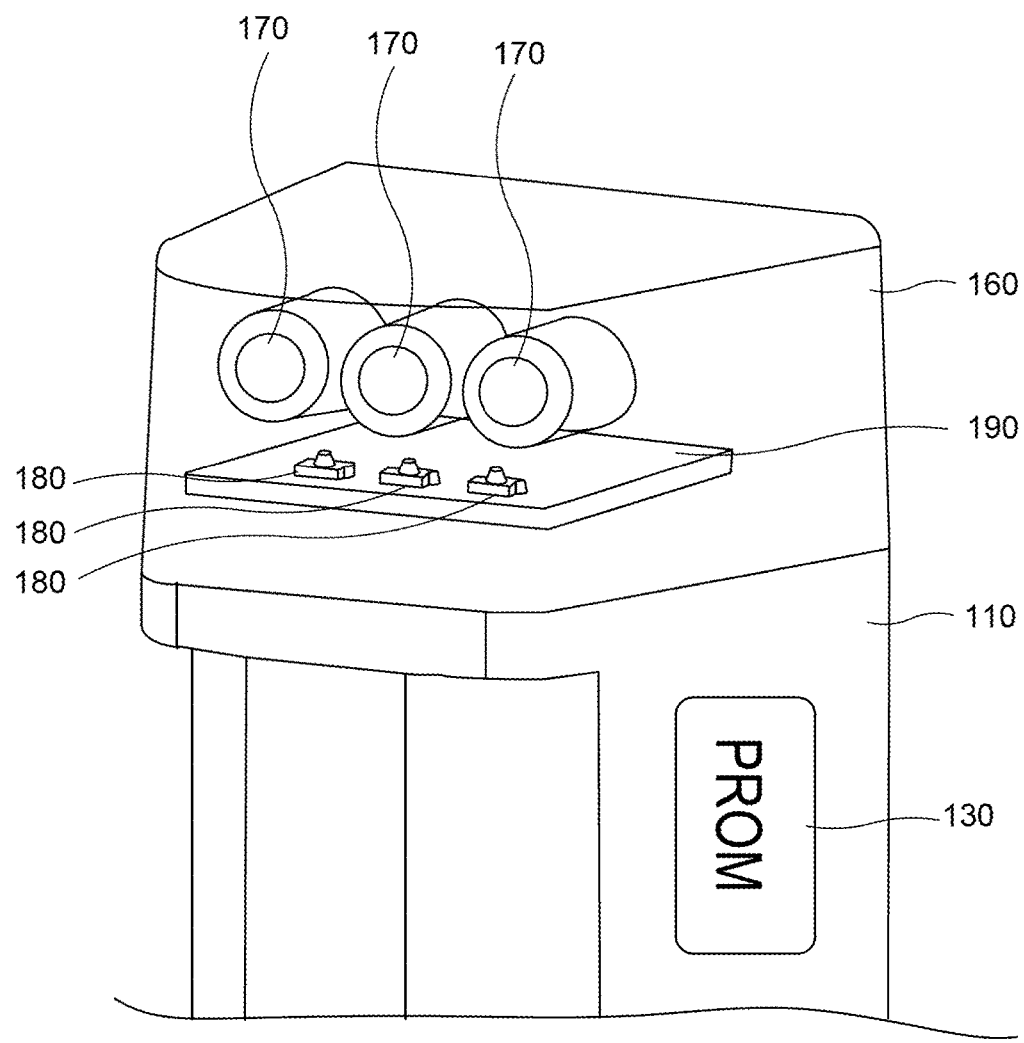
FIG. 1B is an enlarged partial perspective view of the beacon of FIG. 1A when a solid cap is removed.

FIG. 1A is a perspective view showing a physical structure of an infrared (IR) beacon 100 (hereinafter referred to as a "beacon 100") according to an illustrated embodiment. FIG. 1B is an enlarged partial perspective view of the physical structure of beacon 100 when a solid cap is removed.

As illustrated in FIG. 1A, beacon 100 includes a housing 110, a solid cap 120 disposed on one end (e.g., top) of housing 110, a program ("PROM") button 130 disposed on one side of housing 110, a synchronization ("SYNC") button 140 disposed on an opposite side of housing 110, and a rotary switch 150 disposed on an opposite end (e.g., bottom) of housing 110. As illustrated in FIG. 1B, when solid cap 120 is removed, infrared beacon 100 further includes a transparent cap 160, three IR emitter LEDs 170, three indicator LEDs 180, and a control circuit 190 disposed on the end of housing 110 where solid cap 120 was disposed.

Housing 110 can be made of any solid material for containing a power source such as, for example, an AA battery, of beacon 100. Program button 130 disposed on one side of housing 110 is used for a program operation of beacon 100, which will be explained in more detail with reference to FIGS. 3 and 4. Synchronization button 140 disposed on the opposite side of housing 110 is used for a synchronization and/or cascading operation of beacon 100, which will be explained in more detail with reference to FIGS. 5 and 6. In some embodiments, when beacon 100 is configured as a cascade beacon, housing 110 includes a label 110a having a beacon unit number of beacon 100. The beacon unit number can be any natural number.

Solid cap 120 includes a first opening 122 disposed on a top side of solid cap 120 and a second opening 124 disposed on a front side of solid cap 120. When solid cap 120 is disposed on the top of housing 110, solid cap 120 is in close contact with an upper edge 110b of housing 110, such that beacon signals emitted from IR emitter LEDs 170 can only pass through first and second openings 122 and 124 with a reduced intensity. However, IR signals emitted from an external IR emitter, such as a beacon signal emitted from an IR emitter LED of another beacon, or an IR-link signal emitted from an IR emitter of another beacon, cannot pass through first and second openings 122 and 124. Therefore, an IR-link detector disposed inside solid cap 120 can be protected by solid cap 120 from interference by unintended IR signals.

In some embodiments, rotary switch 150 can be a two-position rotary switch that includes an "on" position and an "off" position. Rotary switch 150 is formed with protrusions 150a on opposite sides. The positions of protrusions 150a can be easily recognized by an operator, such that the operator can rotate rotary switch 150 to the "on" position or the "off" position without visual verification. Once rotary switch 150 is rotated to the "on" position, components of beacon 100 are connected to be supplied with electric power from the power source contained in housing 110 to turn on beacon 100. Once rotary switch 150 is rotated to the "off" position, the electric power is disconnected from the components of beacon 200.

In some embodiments, rotary switch 150 can be a three-position switch that includes a third position in addition to the "on" position and the "off" position. The third position can be a spring loaded momentary position past the "on" position. Once rotary switch 150 is in the "on" position, rotary switch 150 can be further rotated from the "on" position, in a direction opposite to the "off" position, to the third position by a rotational force applied by an operator. However, if the rotational force is withdrawn by the operator, rotary switch 150 will rotate back to the "on" position by force of a spring (not shown) connected to rotary switch 150. The third position can be used for initiating various control functions such as, for example, a program control, a synchronization control, a power adjustment control, etc.

IR emitter LEDs 170 can be controlled by a microcontroller (not shown) included on control circuit 190 to emit a beacon signal in the infrared spectrum. The beacon signal can be configured to flash on and off according to a predetermined sequence or pattern that makes up a signaling code.

Indicator LEDs 180 can be controlled by the microcontroller to emit a light signal in the visible light spectrum. Indicator LEDs 180 can be color coded such as, for example, red, green, and yellow. Indicator LEDs 180 can be configured to demonstrate a signaling code of the beacon signal to an operator, indicate whether a factory-installed signaling code or an operator-entered signaling code has been selected, indicate when beacon 100 cannot store additional signaling codes, or indicate that beacon 100 is turned on.

Control circuit 190 can be formed with various electronic components for controlling the operation of beacon 100. The various electronic components can include a power management module including a step-up converter, a communication module including an IR-link detector and an IR-link emitter, the microcontroller mentioned above, a clock module, a voltage driver module, and a current monitor module, which will be explained in more detailed with reference to FIG. 2.

One skilled in the art will now appreciate that beacon 100 can be implemented in a number of different configurations without departing from the scope of the present disclosure. For example, in one embodiment, transparent cap 160 in which IR emitter LEDs 170, indicator LEDs 180, and control circuit 190 are disposed, can be disposed on a side of housing 110 instead of on the end of housing 110 as illustrated in FIG. 1. In addition, beacon 100 can include any number of IR emitter LEDs 170 and any number of indicator LEDs 180.

Figure 2:
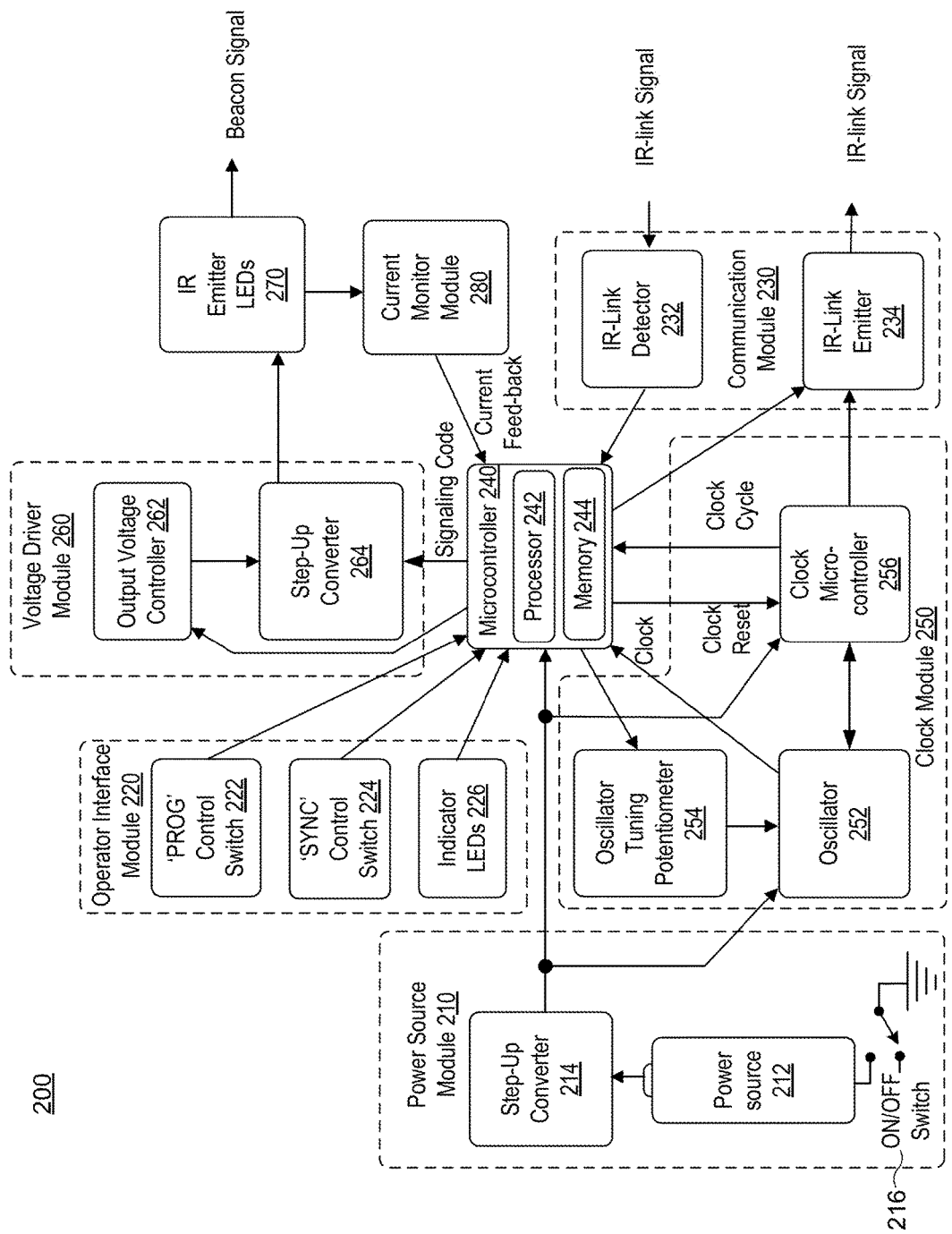
FIG. 2 is a block diagram of an IR beacon according to an illustrated embodiment.

FIG. 2 is a block diagram of an IR beacon 200 (hereinafter referred to "beacon 200") according to an illustrated embodiment. Beacon 200 can correspond to beacon 100 illustrated in FIG. 1. In the embodiment shown in FIG. 2, beacon 200 includes a power source module 210, an operator interface module 220, a communication module 230, a microcontroller 240, a clock module 250, a voltage driver module 260, one or more IR emitter light emitting diodes (LEDs) 270, and a current monitor module 280.

Power source module 210 includes a power source 212, a step-up converter 214, and an on/off switch 216. Power source 212 supplies an output voltage used to power the other components of beacon 200. Power source 212 can be any power source having an output voltage, such as, for example, a single AA battery having an output voltage of 1.1-1.5 Volts (as illustrated in FIG. 2), or a CR123 battery having an output voltage of 3 Volts. Step-up converter 214 can be any device that steps up the voltage supplied by power source 212 to a voltage level sufficiently high to power some of the other components of beacon 200, such as microcontroller 240 and clock module 250. On/off switch 216 can be any device that allows an operator to turn beacon 200 on and off, such as a pushbutton switch or a rotary switch (e.g., rotary switch 150 of FIG. 1A). Once switched to an "on" position, on/off switch 216 completes an electronic circuit including power source 212, which allows components of beacon 200 to be powered by power source 212. Control methods consistent with the present disclosure can be invoked each time program on/off switch 216 is switched to the "on" position. In addition, once on/off switch 216 is switched to the "on" position, an operator can interact with operator interface module 220.

Operator interface module 220 includes a program ("PROG") control switch 222, a synchronization ("SYNC") control switch 224, and one or more indicator LEDs 226, and allows an operator to interact with beacon 200 to perform various functions. Program control switch 222 and synchronization control switch 224 can be any type of switch, such as a pushbutton switch that is electrically connected to microcontroller 240 such that microcontroller 240 senses when program control switch 222 or synchronization control switch 224 are operated. For example, program control switch 222 can be implemented as program button 130 of FIG. 1A, and synchronization control switch 224 can be implemented as synchronization button 140 of FIG. 1A. Program control switch 222 is used to select one or more factory-installed signaling codes stored in beacon 200 and to record new signaling codes. A new signaling code can be recorded by, for example, an operator repeatedly operating program control switch 222 during a desired time interval to create a pattern according to which IR emitter LEDs 270 flash. Synchronization control switch 224 is used when beacon 200 is operating as a synchronizable beacon (hereinafter referred to as "synchro beacon"), the operation of which will be described in more detail with reference to FIGS. 3 and 4, or a cascade beacon, the operation of which will be described in more detail with reference to FIGS. 5 and 6. Indicator LEDs 226 can be any type of color coded (e.g., red, green, and yellow) LEDs, and can demonstrate a signaling code to an operator, can indicate whether a factory-installed signaling code or an operator-entered signaling code has been selected, can indicate when beacon 200 cannot hold additional signaling codes, or can indicate that beacon 200 is turned on and operating. For example, indicator LEDs 226 can be implemented as the three indicator LEDs 180 of FIG. 1B. In some embodiments, operator interface module 220 can further include a sensory button, e.g., one of program control switch 222 and synchronization control switch 224 can be configured as a sensory button. The sensory button can provide to the user a sensation, e.g., vibration, indicating that beacon 200 is turned on and operating.

Communication module 230 includes an IR-link detector 232 and an IR-link emitter 234, and is used for communicating data carried by IR-link signals with one or more external devices such as, for example, another beacon or a calibration device. IR-link detector 232 can be any type of IR receiver, and is configured to receive an IR-link signal having a predetermined frequency (e.g., 37 KHz) transmitted from an external device, and send the received IR-link data carried by the IR-link signal to microcontroller 240. IR-link emitter 234 can be any type of IR transmitter, and is configured to frequency-modulate a signal by using a modulation signal having the predetermined frequency, and transmit the frequency-modulated signal as an IR-link signal to an external device. The modulation signal can be produced by clock module 250. In some embodiments, the IR-link signal emitted by IR-link emitter 234 is orthogonal to the beacon signal emitted by IR emitter LEDs 270, and has a relatively long wavelength and relatively low power compared to the beacon signal. Therefore the IR-link signal does not noticeably interfere with the beacon signal.

Microcontroller 240 can be any device that ties together and drives the other elements of exemplary beacon 200. Microcontroller 240 includes a processor 242 and a memory 244. Processor 242 can be one or more processing devices, such as a central processing unit (CPU), which executes program instructions to perform various functions, such as the processes described in more detail below with respect to FIGS. 4, 6, and 7. Memory 244 can be one or more storage devices that maintain data (e.g., instructions, software applications, information used by and/or generated during execution of instructions or software applications, etc.) used by processor 242. For example, memory 244 can store one or more factory-installed signaling codes or operator-entered signaling codes. Memory 244 can also store a factory-installed delay time when beacon 200 functions as a cascade beacon. Further, memory 244 can store one or more computer programs that, when executed by processor 242, perform one or more processes consistent with the present disclosure. Memory 244 can also store information used by and/or generated during execution, by processor 242, of programs that perform the one or more processes consistent with the present disclosure. Memory 244 can include any kind of storage devices that maintains data. For example, memory 244 can include one or more of ROM, RAM, flash memory, or the like.

Clock module 250 includes an oscillator 252, an oscillator tuning potentiometer 254, and a clock microcontroller 256. Oscillator 252 is configured to generate an oscillating signal with a precise frequency, and supply the oscillating signal to microcontroller 240 and clock microcontroller 256. Oscillator tuning potentiometer 254 is controlled by microcontroller 240 to provide an output voltage to oscillator 252 for adjusting the frequency of the oscillating signal generated by oscillator 252.

Clock microcontroller 256 is configured to generate a clock cycle signal based on the oscillating signal supplied from oscillator 252, and supply the clock cycle signal to microcontroller 240. The clock cycle signal has a fixed clock cycle period, and is used for the timing of the signals to be transmitted from beacon 200, e.g., the beacon signals to be emitted by IR emitter LEDs 270, or the IR-link signals to be emitted by IR-link emitter 234. For example, microcontroller 240 can be configured to transmit signals to IR emitter LEDs 270 or IR-link emitter 234 at a starting time of every clock cycle period indicated by the clock cycle signal. In order to generate the clock cycle signal, clock microcontroller 256 can include a first frequency divider for dividing the frequency of the oscillating signal. For example, if the frequency of the oscillating signal generated by oscillator 252 is 16.32 MHz, then, in order to generate a clock cycle signal with a clock cycle period of 9.9 seconds, the first frequency divider is configured to divide the frequency of the oscillating signal by 161,568,000:1.

Clock microcontroller 256 is also configured to generate a modulation signal with a fixed frequency, and transmits the modulation signal to IR-link emitter 234 for frequency modulation. Clock microcontroller 256 can include a second frequency divider for generating the modulation signal. For example, if the frequency of the oscillating signal generated by oscillator 252 is 16.32 MHz, then, in order to generate a modulation signal with a frequency of 37 KHZ, the second frequency divider is configured to divide the frequency of the oscillating signal by 441:1.

Clock microcontroller 256 is further configured to, in response to a clock reset command received from microcontroller 240, wait for a predetermined period of time and restart the clock cycle period of the clock cycle signal from 0.

Voltage driver module 260 can be any device or combination of devices that can supply a variable voltage to drive IR emitter LEDs 270. Voltage driver module 260 includes an output voltage controller 262 and a step-up converter 264. Output voltage controller 262 receives a command from microcontroller 240 and transmits an output voltage control command to step-up converter 264. Step-up converter 264 receives an input voltage from power source module 210 and the output voltage control command from output voltage controller 262, and converts the input voltage to a voltage level to drive IR emitter LEDs 270 according to the output voltage control command.

IR emitter LEDs 270 can be one or more IR LEDs that emit a beacon signal at a selected or range of frequencies and which can be driven to flash on and off according to a predetermined sequence or pattern that makes up a signaling code. IR emitter LEDs 270 are driven by a voltage supplied from step-up converter 264, and can draw a current that can be monitored by current monitor module 280.

Current monitor module 280 can include any device or combination of devices that monitors the current through IR emitter LEDs 270. Because the current through infrared emitter LEDs 270 cannot be measured directly, current monitor module 280 converts the current flowing through IR emitter LEDs 270 to a current feed-back signal using well-known techniques. This current feed-back signal is sent to microcontroller 240 for power management of beacon 200.

When beacon 100 or 200 is manufactured, the beacon can be configured as a synchro beacon or a cascade beacon. A more detailed description of the synchro beacon will be provided with reference to FIGS. 3 and 4. A more detailed description of the cascade beacon will be provided with reference to FIGS. 5 and 6.

A synchro beacon is capable of being synchronized with a "leader" beacon such that, after synchronization, a set of synchro beacons can emit synchronized beacon signals, i.e., beacon signals with the same signaling code in unison.

Figure 3:
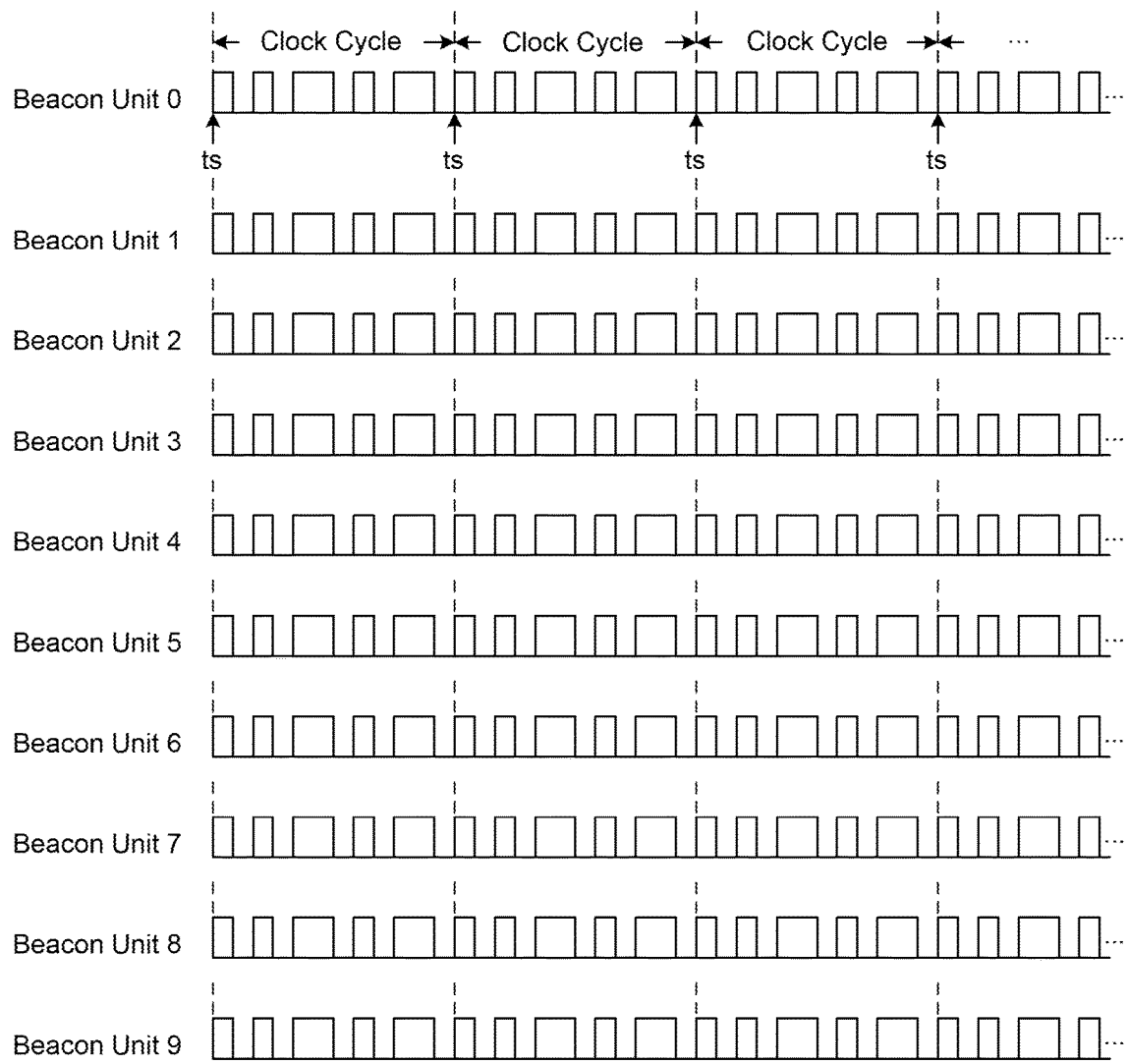
FIG. 3 schematically illustrates beacon signals emitted by a set of synchro beacons, according to an illustrated embodiment.

FIG. 3 schematically illustrates beacon signals emitted by an exemplary set of synchro beacons, according to an illustrated embodiment. According to FIG. 3, the set of synchro beacons consists of ten beacon units, numbered from 0 through 9. Each beacon unit emits a beacon signal at a starting time ts of a clock cycle. Each beacon signal includes an identical signaling code. The respective internal clocks of the set of synchro beacons are synchronized with each other. Therefore, the clock cycles of the synchro beacons are synchronized with each other, with the same starting time ts for each clock cycle. Consequently, the set of synchro beacons emit the same beacon signals at the same clock cycles with the same starting time ts. In such manner, when viewed from short distances, the beacon signals emitted by the set of synchro beacons can be seen as multiple points of light, all of which are flashing in unison and appearing clearly as one group. At longer distances, the individual beacons of the set of synchro beacons blend into a single and much stronger signal than would be seen from just one beacon.

Deploying a set of synchro beacons requires that at setup, one synchro beacon is selected as a leader beacon and then its signaling code and clock synchronization information are communicated to all the other beacons (hereinafter referred to as follower beacons) of the set of synchro beacons. Any follower beacon, once synchronized to the leader beacon, can be then used to synchronize any additional beacons. There is a very small timing error introduced by every synchronization transfer. However, the timing error is small enough that multiple promulgations of synchronization can be performed without compromising the integrity of the beacon signals emitted by the set of synchro beacons.

Figure 4:
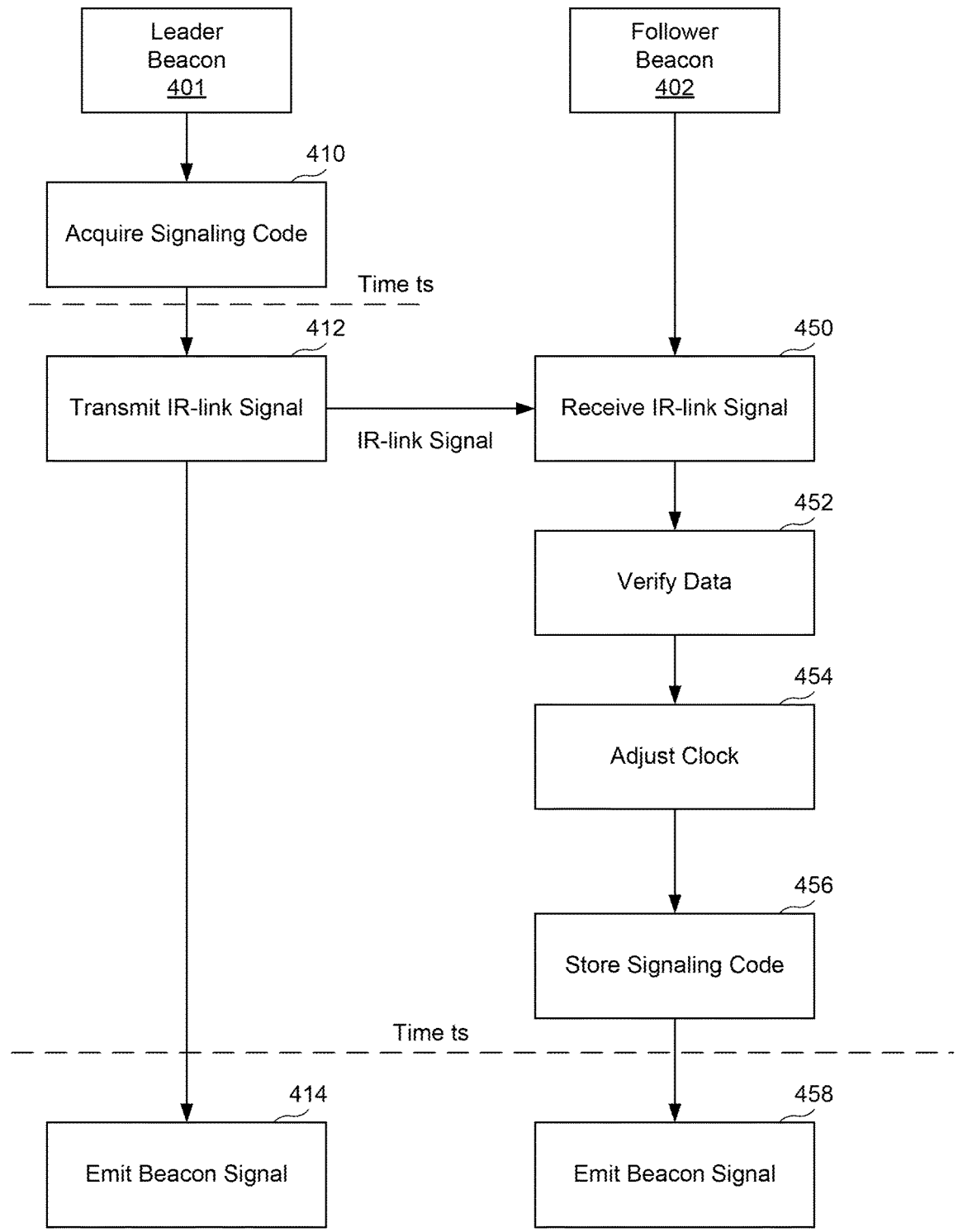
FIG. 4 is a flow chart showing a process of controlling a leader beacon and a follower beacon in a set of synchro beacons, according to an illustrated embodiment.

FIG. 4 is a flow chart showing a process of controlling a leader beacon 401 and a follower beacon 402 in a set of synchro beacons, according to an illustrated embodiment. Leader beacon 401 and follower beacon 402 can be controlled by their respective microcontrollers (e.g., microcontroller 240 of FIG. 2).

Referring to FIG. 4, first, leader beacon 401 acquires a signaling code of beacon signals to be emitted in unison by both of leader beacon 401 and follower beacon 402 (step 410). In particular, the microcontroller of leader beacon 401 can acquire the signaling code from a memory (e.g., memory 244 of FIG. 2). For example, the operator of leader beacon 401 can operate a program control switch (e.g., program control switch 222 of FIG. 2) of the leader beacon to select a signaling code from the memory (e.g., memory 244 of FIG. 2), and then the microcontroller can acquire the selected signaling code from the memory. As another example, the operator can operate the program control switch to record a new signaling code into the memory, and then the microcontroller can acquire the new signaling code from the memory.

When the operator of leader beacon 401 operates a synchronization control switch (e.g., synchronization control switch 224 of FIG. 2) of leader beacon 401, leader beacon 401 transmits an IR-link data packet to follower beacon 402 via an IR-link emitter (e.g., IR-link emitter 234 of FIG. 2) at a starting time of a next clock cycle (step 412). The IR-link data packet consists of a first data block including an identifier of leader beacon 401, a second data block including the signaling code acquired in step 410, a third data block including an instruction code for follower beacon 402, and a fourth data block including a verification code. The instruction code can instruct follower beacon 402 to synchronize the clock, and emit a beacon signal. The verification code can be a check sum value of the data included in the IR-link data packet. Each of the first through fourth data blocks has a fixed length which is known by follower beacon 402.

Step 412 is triggered by the operator of leader beacon 401 operating the synchronization control switch of leader beacon 401. Specifically, when the microcontroller of leader beacon 401 detects that the synchronization control switch of leader beacon 401 is operated, the microcontroller waits for the starting time ts of the next clock cycle immediately following the current clock cycle, and transmits the IR-link data packet to the IR-link emitter at the starting time ts of the next clock cycle. The IR-link emitter modulates the IR-link data packet by a modulation signal to generate an IR-link signal, and then emits the IR-link signal. Because the IR-link signal is emitted at about the starting time ts of the next clock cycle, the IR-link signal inherently includes clock synchronization information of leader beacon 401. In some embodiment, before the microcontroller transmits the IR-link data packet to the IR-link emitter, the microcontroller also encrypts the IR-link data packet using a special encryption method known by follower beacon 402.

In order to successfully transmit the IR-link signal, the operator of leader beacon 401 can orient and point the IR-link emitter of leader beacon 401 towards follower beacon 402, and an operator of follower beacon 402 can orient and point an IR-link detector (e.g., IR-link detector 232) of follower beacon 402 towards leader beacon 401.

Then, when the clock of leader beacon 401 indicates that it is the starting time ts of a clock cycle immediately following the clock cycle where leader beacon 401 transmits the IR-link data packet, leader beacon 401 immediately starts emitting a beacon signal in successive clock cycles, starting from the starting time ts (step 414). Specifically, the microcontroller of leader beacon 401 transmits the signaling code to a voltage driver module (e.g., voltage driver module 260 of FIG. 2) of leader beacon 401. The voltage driver module then drives IR emitter LEDs (e.g., IR emitter LEDS 270 of FIG. 2) of leader beacon 401 according to the signaling code. As a result, the IR emitter LEDs of leader beacon 401 transmit the beacon signal in successive signaling cycles.

Meanwhile, follower beacon 402 receives the IR-link signal transmitted from leader beacon 401 (step 450). Specifically, when an IR-link detector (e.g., IR-link detector 232 of FIG. 2) of follower beacon 402 detects the IR-link signal from leader beacon 401, the IR-link detector demodulates the IR-link signal using a modulation signal with an identical frequency as the modulation signal used by the IR-link emitter of leader beacon 401 for frequency modulating the IR-link data packet, to recover the IR-link data packet, and then transmits IR-link data packet to the microcontroller of follower beacon 402.

Then, follower beacon 402 verifies the data included in the IR-link signal received from leader beacon 401 (step 452). Specifically, a memory (e.g., memory 244 of FIG. 2) of follower beacon 402 is configured to store information regarding the length of the IR-link data packet, as well as information regarding the length of each of first through fourth data blocks included the IR-link data packet. Based on the stored information, the microcontroller of follower beacon 402 parses the received IR-link data packet to extract the identifier, signaling code, instruction code, and verification code, and verifies the identifier and mathematical integrity of the data. For example, the microcontroller checks whether the extracted identifier matches one or more identifiers of authorized beacon units pre-stored in the memory of follower beacon 402. As another example, if the verification code is a check sum value of the data included in the IR-link data packet, the microcontroller calculates a check sum value of the data included in the received IR-link data packet, and then checks whether the check sum value resulting from the calculation matches the check sum value included in the received IR-link data packet.

Assuming the data included in the IR-link signal is verified, the microcontroller of follower beacon 402 immediately changes the operation of follower beacon 402 as instructed by the data received from leader beacon 401.

In particular, follower beacon 402 adjusts a clock (e.g., clock module 250 of FIG. 2) of follower beacon 402 to be synchronized with the clock of leader beacon 401 (step 454). Specifically, the microcontroller of follower beacon 402 transmits a clock reset command to a clock microcontroller (e.g., clock microcontroller 256 of FIG. 2) immediately after the data is verified at step 452. As described previously, the IR-link signal is transmitted from leader beacon 401 at approximately the starting time of a clock cycle of leader beacon 401. It takes a certain amount of time for the IR-link signal to travel to follower beacon 402, and for follower beacon 402 to process the IR-link signal and verify the data included in the IR-link signal. Therefore, when the clock microcontroller receives the clock reset command from the microcontroller, it is already the certain amount of time after the starting time of the clock cycle of leader beacon 401. Therefore, in order to synchronize the clock of follower beacon with the clock of leader beacon 401, the clock microcontroller waits for a predetermined period of time and then restarts its clock cycle period of from 0. The predetermined period of time is used for compensating the time necessary for follower beacon 402 to receive and process the IR-link data packet. The predetermined period of time can be determined as the clock cycle period minus a first amount of time for transmission of the IR-link signal from leader beacon 401 to follower beacon 402, and a second time interval for processing and verifying data included in the IR-link signal at follower beacon 402. For example, if the clock cycle period is 9.9 seconds, and it takes 1 second to transmit the IR-link signal from leader beacon 401 to follower beacon 402, and 0.1 second to process and verify data included in the IR-link signal, then the clock microcontroller will wait for 8.8 second after receiving the clock reset command to restart the clock cycle from 0. After clock synchronization, the clock cycle signal generated by the clock of follower beacon 402 should have the same clock cycle as that of the leader beacon 401.

Follower beacon 402 also stores the signaling code included in the received IR-link data packet into the memory of follower beacon 402 (step 456). Successful receipt of the signaling data and the clock synchronization data and changing the operation of follower beacon 402 can be indicated to the operator of follower beacon 402 by a "Victory" flashing pattern emitted by indicator LEDs (e.g., indicator LEDs 226 of FIG. 2) of follower beacon 402. Should the transmission not be successful, a "Wave-off" flashing pattern will be shown by the indicator LEDs.

When the clock of follower beacon 402 indicates that it is the starting time ts of a clock cycle, follower beacon 402 immediately starts emitting a beacon signal in successive clock cycles, starting from the starting time ts (step 458). Specifically, the microcontroller of follower beacon 402 transmits the signaling code and a clock cycle signal generated by the clock of follower beacon 402 to a voltage driver module (e.g., voltage driver module 260 of FIG. 2) of follower beacon 402. The voltage driver module then drives IR emitter LEDs (e.g., IR emitter LEDS 270 of FIG. 2) of follower beacon 402 according to the signaling code and the clock cycle signal. As a result, the IR emitter LEDs of follower beacon 402 transmits the beacon signal in successive clock cycles. The beacon signal emitted by follower beacon 402 is the same as and is synchronized with the beacon signal transmitted by leader beacon 401.

Leader beacon 401 and follower beacon 402 can continue to emit beacon signals in unison independently for approximately 24 hours or until power is interrupted. After synchronization, there is no need for any further communication between leader beacon 401 and follower beacon 402.

In the embodiment illustrated in FIG. 4, there is only one follower beacon. However those of ordinary skill in the art will now recognize that more than one follower beacon can be included in the set of synchro beacons. The set of synchro beacons can be deployed completely independent from each other, emitting beacon signals with the same signaling code, regardless of terrain or separation distance. In addition, any follower beacon that has been synchronized with the leader beacon can function as a leader beacon to synchronize other beacons, by the operator of the follower beacon operating a synchronization control switch on the follower beacon. Therefore, should any beacon lose synchronization for one reason or another, the beacon can be re-synchronized at any time from any of the beacon of the group and thereby rejoin the group in synchronism.

As described above, when a beacon is manufactured in a factory, the beacon can be configured as a synchro beacon or a cascade beacon. A cascade beacon is capable of delaying emission of its beacon signal from the starting time of each clock cycle by a fixed delay time, such that a set of cascade beacons can emit cascading beacon signals with an identical signaling code but delayed from each other. In such manner, the set of cascade beacons create a pattern of a moving light pulse. To create this effect, the set of cascade beacons emit the same beacon signal, but delayed by a time interval relative to the beacon signals emitted from their respective adjacent beacons. The delay time of a cascade beacon can be pre-stored in an internal memory and can be indicated on a label (e.g., label 110a of FIG. 1) by a beacon unit number. The cascade beacons are built using the same hardware and operate essentially the same way as the synchro beacons, with the only difference being the firmware that is loaded into the microcontrollers.

Figure 5:
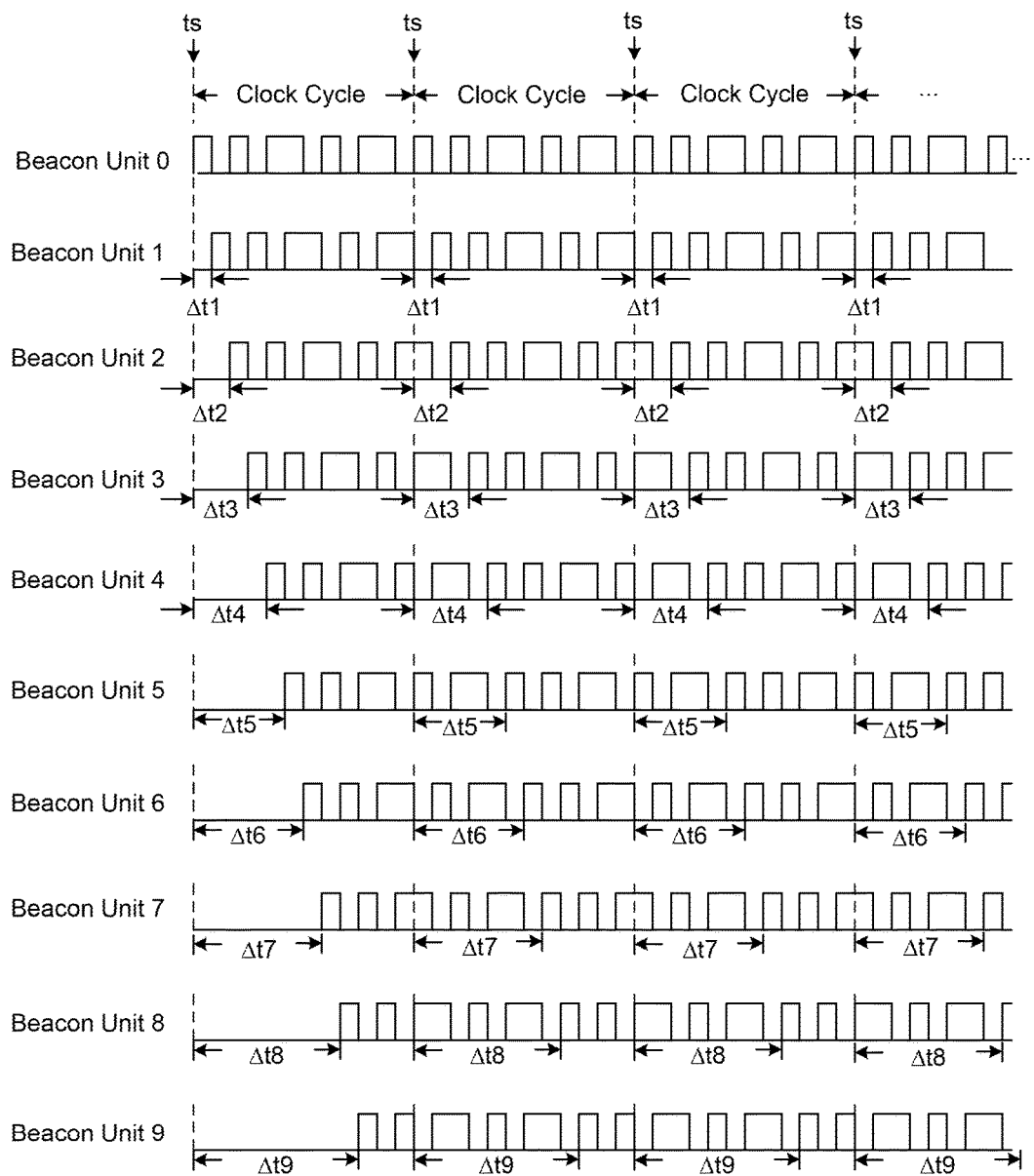
FIG. 5 schematically illustrates beacon signals emitted by a set of cascade beacons, according to an illustrated embodiment.

FIG. 5 schematically illustrates beacon signals emitted by an exemplary set of cascade beacons, according to an illustrated embodiment. According to FIG. 5, the set of cascade beacons consists of ten beacon units, numbered from 0 through 9. The internal clocks of the set of cascade beacons are synchronized with each other. Therefore, the clock cycles of the synchro beacons are synchronized with each other, with the same starting time ts for each clock cycle. Each one of beacon units 1 through 9 emits a beacon signal with a respective delay time, i.e., $\Delta t1$ though $\Delta t9$, relative to the starting time ts of each clock cycle. The respective delay time can be pre-stored in a memory (i.e., memory 244 of FIG. 2) of each cascade beacon, and can be indicated by a beacon unit number written on a label. The beacon unit number denotes the number of units of delay a beacon has. For example, a beacon unit N (N being one of 1 through 9) has a delay time of $N \times \Delta t1$ relative to beacon unit 0, i.e., $\Delta t_N = N \times \Delta t1$.

Any beacon in the set of cascade beacons can act as a leader. However, just as with the synchro beacons, all cascade beacons must be synchronized to each other. Once synchronized, then when the beacons are arranged sequentially according to the unit numbers and spaced along a line or circle with more or less the same separation, the effect of a moving light pulse will be created.

Figure 6:
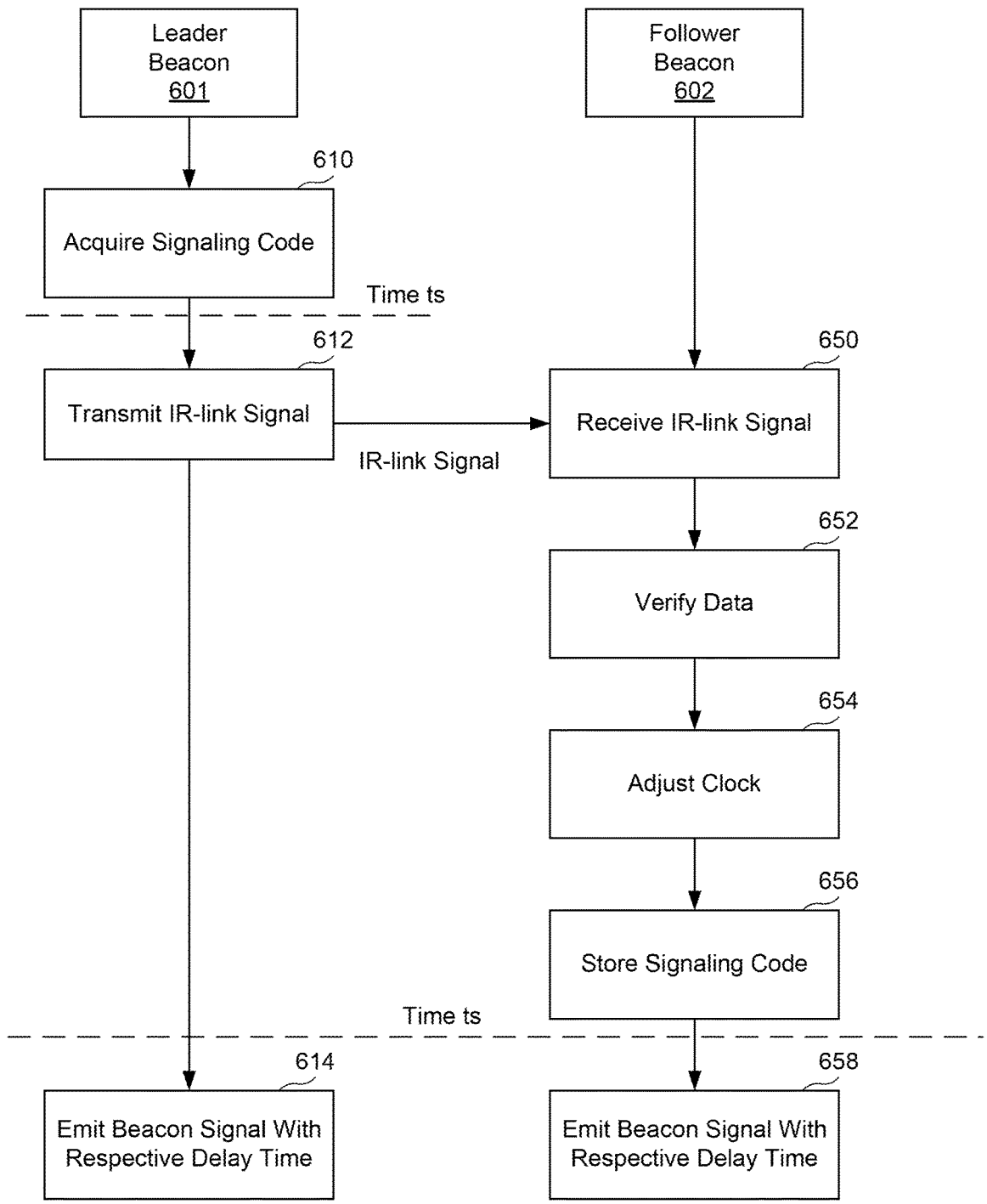
FIG. 6 is a flow chart showing a process of controlling a leader beacon and a follower beacon in a set of cascade beacons, according to an illustrated embodiment.

FIG. 6 is a flow chart showing a process of controlling a leader beacon 601 and a follower beacon 602 in a set of cascade beacons, according to an illustrated embodiment. The control of leader beacon 601 and follower beacon 602 can be performed by their respective microcontrollers (e.g., microcontroller 240 of FIG. 2).

Leader beacon 601 and follower beacon 602 can be any one of beacon units 0 through 9 illustrated in FIG. 6. For example below, leader beacon 601 is beacon unit 1, and follower beacon 602 is beacon unit 2. Thus, before the process of FIG. 6 starts, a delay time of $\Delta t1$ is stored in a memory of leader beacon 601, and a delay time of $\Delta t2$ is stored in a memory of follower beacon 602.

First, leader beacon 601 acquires a signaling code of beacon signals to be emitted by both of leader beacon 601 and follower beacon 602 (step 610). The manner of performing step 610 is similar to that of step 410. Therefore, detailed description of step 610 is not repeated.

When the operator of leader beacon 601 operates a synchronization control switch (e.g., synchronization control switch 224 of FIG. 2) of leader beacon 601, leader beacon 601 transmits an IR-link signal including an IR-link data packet to follower beacon 602 via an IR-link emitter (e.g., IR-link emitter 234 of FIG. 2) at a starting time of a next clock cycle (step 612). The manner of performing step 612 is similar to that of step 412. Therefore, detailed description of step 612 is not repeated.

Then, when the clock of leader beacon 601 indicates that it is the starting time ts of a clock cycle immediately following the clock cycle where leader beacon 601 transmits the IR-link data packet, leader beacon 601 starts emitting a beacon signal with a delay time relative to the starting time ts of the clock cycle (step 614). The delay time is stored in the memory of leader beacon 601. For example, if leader beacon 601 is beacon unit 1 of FIG. 5, then the microcontroller of leader beacon 601 waits for a delay time period of $\Delta t1$ and then controls IR emitter LEDs (e.g., IR emitter LEDs 270 of FIG. 2) of leader beacon 601 to emit a beacon signal including the signaling code acquired at step 610 in successive signaling cycles. As another example, if leader beacon 601 is beacon unit 0 of FIG. 5, then the microcontroller controls the IR emitter LEDs to immediately emit the beacon signal without waiting for any delay time period.

Follower beacon 602 receives the IR-link signal from leader beacon 601 (step 650). Specifically, an IR-link detector of follower beacon 602 detects the IR-link signal from leader beacon 601 and then transmits the IR-link signal to the microcontroller of follower beacon 602.

Then, follower beacon 602 verifies the data included in the IR-link signal received from leader beacon 601 (step 652). The manner of performing step 652 is similar to that of step 452. Therefore, detailed description of step 652 is not repeated.

Assuming the data included in the IR-link signal is verified, the microcontroller of follower beacon 602 immediately changes the operation of follower beacon 602 as directed by the data received from leader beacon 601.

In particular, follower beacon 602 adjusts the clock (e.g., clock module 250 of FIG. 2) of follower beacon 602 to be synchronized with the clock of leader beacon 601 according to the clock synchronization data (step 654). The manner of performing step 654 is similar to that of step 454. Therefore, detailed description of step 654 is not repeated.

In addition, follower beacon 602 stores the signaling code received from leader beacon 601 into the memory of follower beacon 602 (step 656).

When the clock of follower beacon 602 indicates that it is the starting time ts of a clock cycle, follower beacon 602 starts emitting a beacon signal with a delay time relative to the starting time ts of the clock cycle (step 658). The delay time is stored in the memory of follower beacon 602. For example, if follower beacon 602 is beacon unit 2 of FIG. 5, then the microcontroller of follower beacon 602 waits for a delay time period of $\Delta t2$ and then controls IR emitter LEDs of follower beacon 602 to emit a beacon signal including the signaling code received from leader beacon 601 in successive signal cycles.

In one embodiment, a set of beacons includes a plurality of subsets of beacons. The beacons in each subset of beacons are synchronized with each other, i.e., can emit synchronized beacon signals. The beacon signals emitted by each subset of beacons are cascaded with the beacon signals emitted by their neighboring subsets of beacons. In order to realize such a scenario, for example, each subset of beacons include a sub-leader beacon which is a cascade beacon having a delay time, and a plurality of synchro beacons synchronized to the sub-leader beacon.

In both of the synchro beacons and the cascade beacons, the clock cycle signals of the beacons are synchronized with each other. Only when their clock cycle signals are synchronized with each other, can the synchronized effect or the cascading effect of beacon signal transmission be realized. However, the clock cycle signals are generated from the oscillating signals generated by the oscillator (e.g., oscillator 252 of FIG. 2), and the oscillator may be affected by temperature variations, resulting in drifting of the clock cycle signals. Therefore, it may be necessary to recalibrate the oscillators after the beacons are manufactured.

Figure 7:
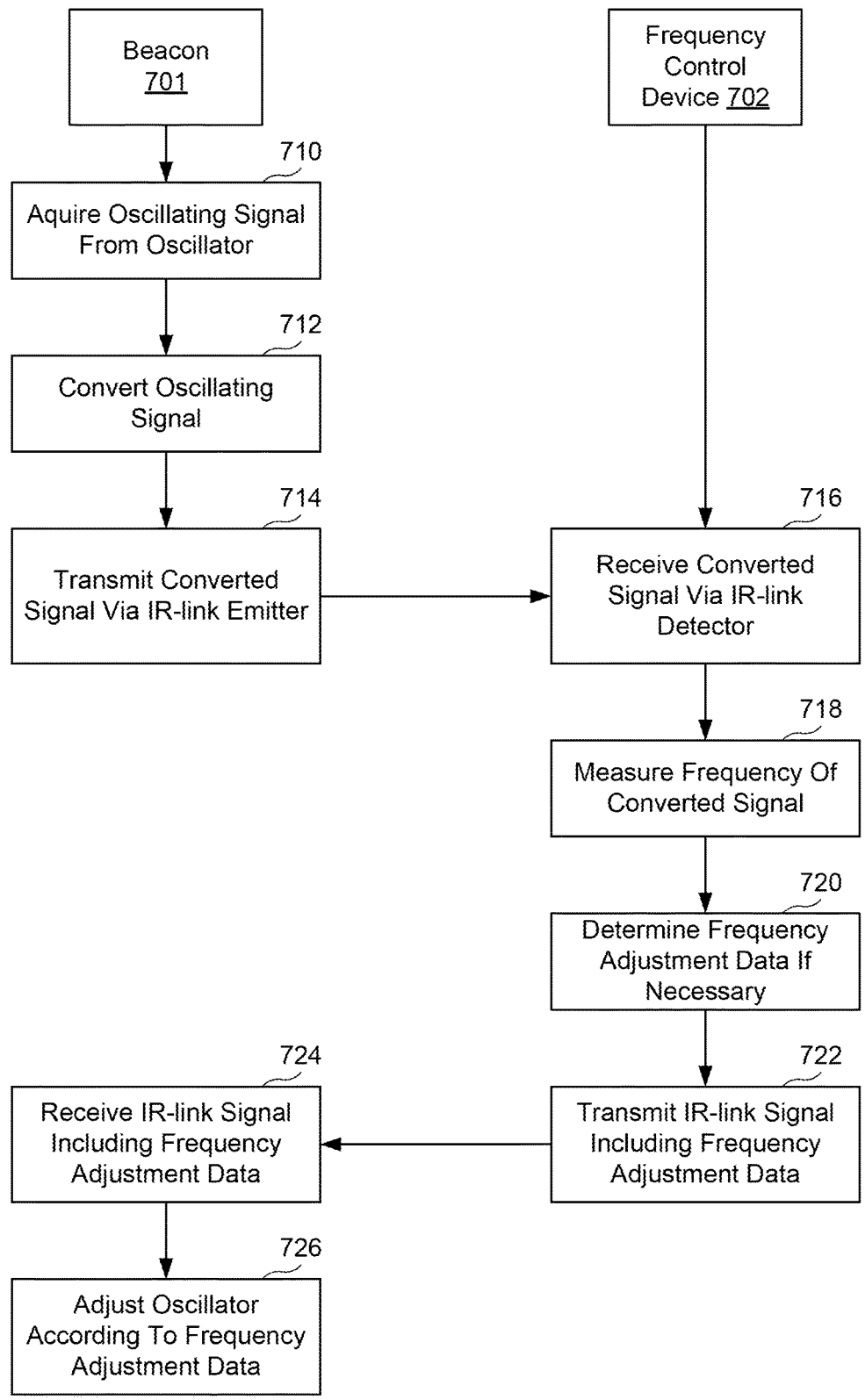
FIG. 7 is a flow chart of a process of calibrating an oscillator in a beacon according to an illustrated embodiment.

FIG. 7 is a flow chart of a process of calibrating an oscillator in a beacon according to an illustrated embodiment. The process can be applied to a beacon 701 communicating with a calibration device 702, which is external to and separated from beacon 701.

Referring to FIG. 7, first, beacon 701 acquires an oscillating signal generated by an oscillator (step 710). For example, a microcontroller (e.g., microcontroller 240 of FIG. 2) of beacon 701 acquires the oscillating signal from the oscillator (e.g., oscillator 252 of FIG. 2). In one embodiment, the oscillator periodically sends its oscillating signal to the microcontroller. Alternatively, in another embodiment, the microcontroller sends a request for the oscillating signal to the oscillator, and, in response to the request, the oscillator sends its oscillating signal to the microcontroller.

Beacon 701 then converts the oscillating signal to a signal having a frequency which is proportionally lower than the frequency of the oscillating signal (step 712). For example, the microcontroller of beacon 701 includes a digital or analog frequency divider that is configured to generate a signal (hereinafter referred to as the "converted signal") having a frequency that is a fraction of the frequency of the oscillating signal.

Beacon 701 then transmits the converted signal via an IR-link emitter of the beacon (step 714). For example, the clock microcontroller of beacon 701 transmits the converted signal to the IR-link emitter (e.g., IR-link emitter 234 of FIG. 2), which then transmits the converted signal to calibration device 702.

Calibration device 702 receives the converted signal from beacon 701 via an IR-link detector of calibration device 702 (step 716). Calibration device 702 then measures a frequency of the received converted signal (step 718), and determines whether the oscillator of beacon 701 needs to be adjusted. If the oscillator of beacon 701 needs to be adjusted, calibration device 702 determines frequency adjustment data based on the frequency of the received signal (step 720). Next, calibration device 702 transmits an IR-link signal including the frequency adjustment data determined at step 720 to beacon 701 (step 722).

Beacon 701 receives the IR-link signal transmitted from calibration device 702 via an IR-link detector (e.g., IR-link detector 232) of beacon 701 (step 724). For example, the IR-link detector of beacon 701 receives the IR-link signal and transmits the IR-link signal to the microcontroller.

Beacon 701 then adjusts the oscillator according to the frequency adjustment data included in the IR-link signal (step 726). For example, the microcontroller of beacon 701 parses the IR-link signal to obtain the frequency adjustment data, and, according to the frequency adjustment data, controls an oscillator tuning potentiometer (e.g., oscillator tuning potentiometer 254 of FIG. 2) to output a voltage to the oscillator to adjust the frequency of the oscillating signal generated by the oscillator.

In the present embodiment, by converting the oscillating signal and transmitting the converted signal via the IR-link emitter to calibration device 702 for calibration, and adjusting the oscillator based on frequency adjustment data determined by calibration device 702, the oscillator can be tuned without the need of any mechanical or electrical contact.

Figure 8:
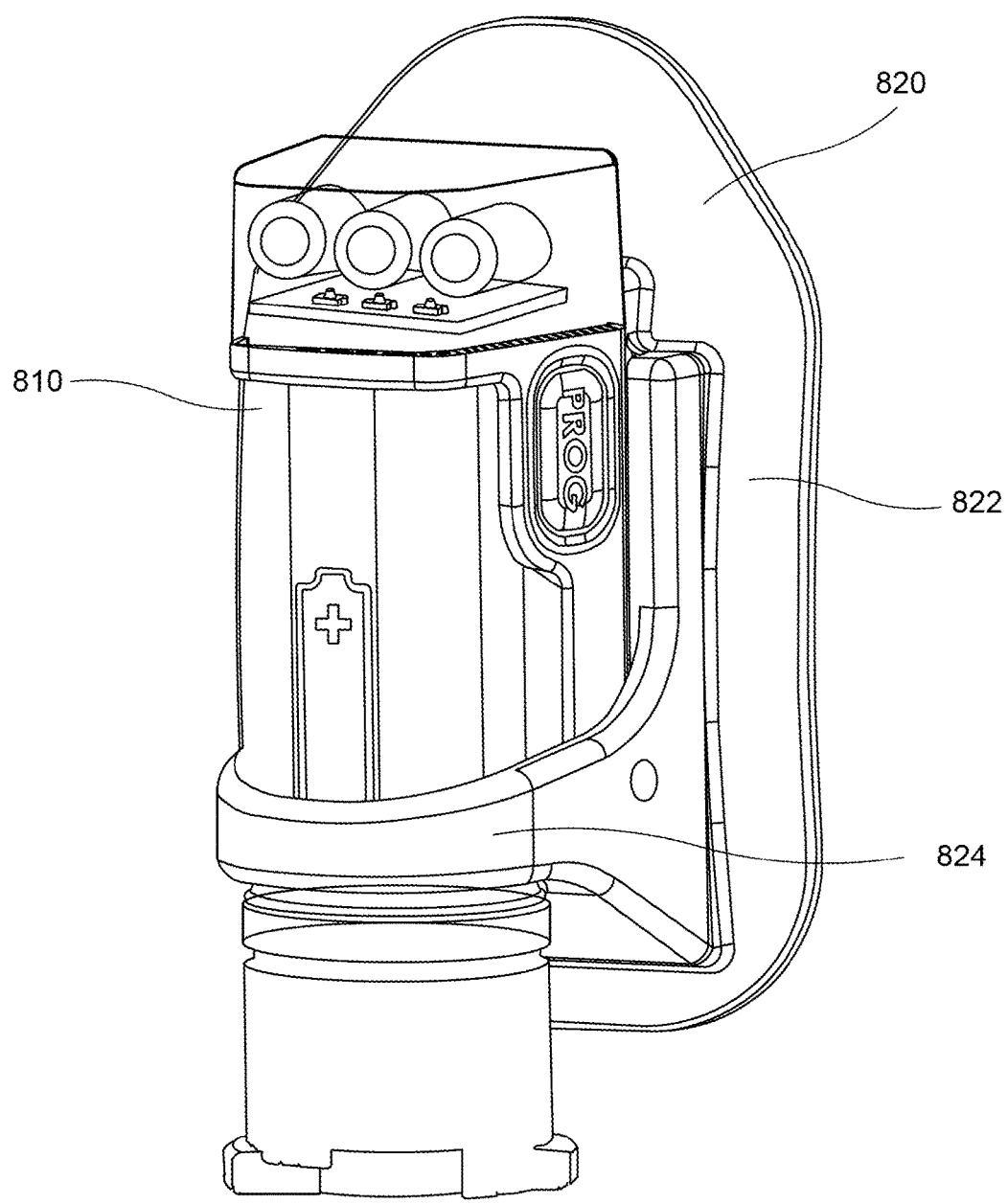
FIG. 8 is a perspective view showing a beacon and a helmet mount for mounting the beacon to a soldier's helmet, according to an illustrated embodiment.

Beacons are generally carried by soldiers and law enforcement personnel. In one embodiment, beacons can be carried on the soldier's helmet. FIG. 8 is a perspective view showing a beacon 810 and a helmet mount 820 for mounting beacon 810 to a soldier's helmet, according to an illustrated embodiment.

As illustrated in FIG. 8, helmet mount 820 includes a contoured body 822 and a holding portion 824 attached to contoured body 822. Contoured body 822 is configured to have a specific shape that can be fitted on the solder's helmet. An inner circumference of holding portion 824 is configured to have nearly the same size as an outer circumference of beacon 810, such that beacon 810 can be inserted and fixed in holding portion 824. When beacon 810 is fixed in holding portion 824, contoured body 822 can be attached to the solder's helmet with an IR emitter of beacon 810 facing upward or facing toward another soldier.

In another embodiment, beacons can be mounted to MOLLE (MOdular Lightweight Load-carrying Equipment) systems. A MOLLE system consists of rows and/or columns of heavy-duty nylon straps interleaved together and attached/stitched to a solider's garment (e.g., vest, jacket, pants) or backpack for mounting various MOLLE compatible accessories.

Figure 9B:
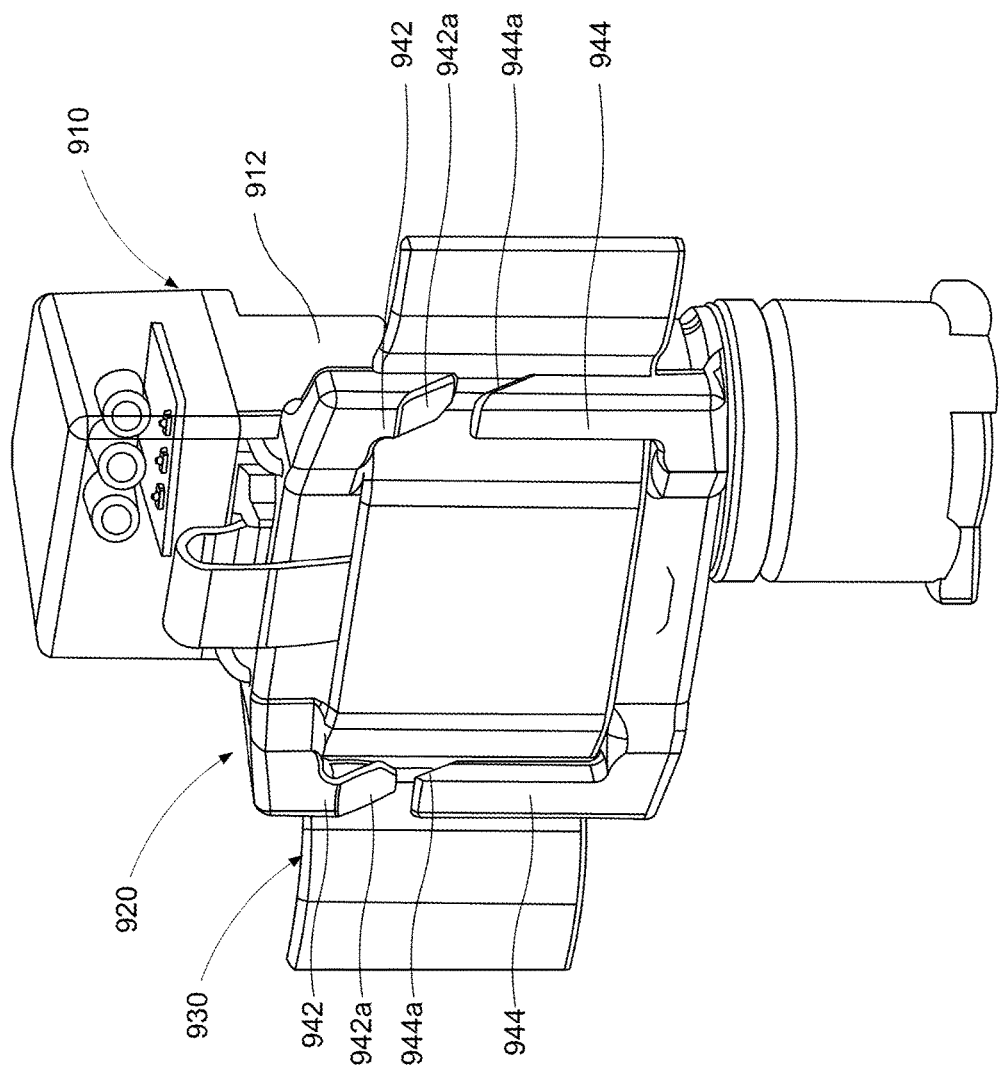
FIG. 9B is a perspective view of the beacon of FIG. 9A mounted to a strap of a MOLLE system via the attachment mount of FIG. 9A.

FIG. 9A is a perspective view showing a beacon 910 and an attachment mount 920 for mounting beacon 910 to a MOLLE system carried by a soldier, according to an illustrate embodiment. FIG. 9B is a perspective view of beacon 910 mounted to a strap 930 of the MOLLE system via attachment mount 920.

As illustrated in FIGS. 9A and 9B, attachment mount 920 is formed on a backside of a housing 912 of beacon 910. Attachment mount 920 includes a body 922 and two identical mounting sections 924 and 926 disposed at opposite sides of body 922. Each one of mounting sections 924 and 926 includes a pair of arms 942 and 944 extending toward each other and spaced apart from body 922 to partially surround a space 950 for receiving strap 930. In addition, opposite ends 942a and 944a of arms 942 and 944, respectively, are spaced apart from each other and have inclined surfaces that face each other, in order for strap 930 to be passed therethrough. Moreover, arm 944 is longer than arm 942.

As described above, systems and methods consistent with the present disclosure provide a synchro beacon that can be synchronized with a "leader" beacon and can emit synchronized beacon signals with the "leader" beacon. The systems and methods consistent with the present disclosure also provide a cascade beacon that can emit a cascaded beacon signal with respect to a "leader" beacon.

For purposes of explanation only, certain aspects and embodiments are described herein with reference to the components illustrated in FIGS. 1-9. The functionality of the illustrated components can overlap, however, and can be present in a fewer or greater number of elements and components. Further, all or part of the functionality of the illustrated elements can co-exist on a single integrated circuit chip or be distributed among several integrated circuit chips. Moreover, embodiments, features, aspects, and principles disclosed herein can be implemented in various environments and are not limited to the illustrated environments. For example, while FIGS. 1A, 1B, and 2 have been described with respect to beacons including infrared LEDs 170, the embodiments of FIGS. 1A, 1B, and 2 can alternatively apply to beacons including other emitters, such as thermal LEDs or other devices that emit thermal or infrared signatures.

Further, the sequences of events described in FIGS. 4, 6, and 7 are exemplary and not intended to be limiting. Thus, other process stages can be used, and even with the processes depicted in FIGS. 4, 6, and 7, the particular order of events can vary without departing from the scope of the disclosed embodiments. Moreover, certain process stages can be omitted and additional stages can be implemented in FIGS. 4, 6, and 7. Also, the processes described herein are not inherently related to any particular system or apparatus and can be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A beacon, comprising:
   an infrared emitter configured to emit beacon signals;
   an infrared-link emitter configured to emit infrared-link signals having a wavelength different from that of the beacon signals emitted by the infrared emitter;
   an infrared-link detector configured to detect infrared-link signals;
   a memory configured to store a delay time;
   a clock configured to generate a clock cycle signal; and
   a microcontroller configured to, in response to receiving an infrared-link signal including a signaling code and clock synchronization data from an external beacon via the infrared-link detector:
      adjust the clock to be synchronized with a clock of the external beacon, according to the clock synchronization data;
      store the signaling code in the memory; and
      when the clock cycle signal generated by the clock indicates that it is a starting time of a clock cycle period, control the infrared emitter to emit a beacon signal including the signaling code with the delay time relative to the starting time of the clock cycle period.

2. The beacon of claim 1, further comprising a synchronization control switch,
   wherein the microcontroller is further configured to, in response to detecting an operation of the synchronization control switch:
      control the infrared-link emitter to emit an infrared-link signal including the signaling code stored in the memory and clock synchronization data regarding the clock.

3. The beacon of claim 1, wherein the clock includes an oscillator configured to generate an oscillating signal, the microcontroller being further configured to:
   convert the oscillating signal generated by the oscillator to a converted signal having a frequency proportionally lower than a frequency of the oscillating signal;
   control the infrared-link emitter to transmit the converted signal to a calibration device external to the beacon; and
   in response to receiving an infrared-link signal including frequency adjustment data from the calibration device, adjust a frequency of the oscillating signal generated by the oscillator based on the frequency adjustment data.

4. The beacon of claim 1, further comprising a program control switch,
   wherein the microcontroller is further configured to, in response to detecting an operation of the program control switch, acquire a signaling code.

5. The beacon of claim 1, further comprising:
   a housing for containing a power source for the beacon;
   a transparent cap disposed on one end of the housing on which the infrared emitter, the infrared-link detector, and the infrared-link detector are disposed;
   a rotary switch disposed on an opposite end of the housing;
   a program control switch disposed on one side of the housing; and
   a synchronization control switch disposed on an opposite side of the housing.

6. The beacon of claim 5, wherein the rotary switch is either one of:
   a two-position switch including an "on" position and an "off" position; or
   a three-position switch including an "on" position, an "off" position, and a third position for initiating a control function.

7. The beacon of claim 5, further comprising a label having a beacon unit number related to the delay time stored in the memory.

8. The beacon of claim 1, further comprising a helmet mount structure for holding the beacon to be mounted onto a helmet of an operator.

9. The beacon of claim 1, further comprising a MOLLE (MOdular Lightweight Load-carrying Equipment) attachment mount for mounting the beacon to a MOLLE system.

10. The beacon of claim 1, wherein the clock includes:
    an oscillator configured to generate an oscillating signal; and
    a clock microcontroller coupled to the oscillator and configured to generate the clock cycle signal with the clock cycle period based on the oscillating signal.

11. The beacon of claim 1, wherein the clock microcontroller is further configured to:
    in response to receiving a clock reset command from the microcontroller, wait for a predetermined period of time and restart the clock cycle period of the clock cycle signal from 0.

12. A method for controlling a beacon, comprising:
    detecting, by an infrared-link detector of the beacon, an infrared-link signal transmitted from an external beacon, the infrared-link signal including a signaling code and clock synchronization data;
    adjusting, by a microcontroller of the beacon, a clock of the beacon to be synchronized with a clock of the external beacon according to the clock synchronization data;
    storing, by the microcontroller of the beacon, the signaling code in a memory of the beacon; and when a clock cycle signal generated by the clock indicates that it is a starting time of a clock cycle, controlling, by the microcontroller of the beacon, an infrared emitter to emit a beacon signal including the signaling code with a delay time relative to the starting time of the clock cycle, the delay time being stored in the memory of the beacon.

13. The method of claim 12, further including:

in response to detecting an operation of a synchronization control switch, controlling, by the microcontroller, the infrared-link emitter to emit an infrared-link signal including the signaling code stored in the memory and clock synchronization data regarding the clock.

14. The method of claim 12, further including:

converting, by the microcontroller, an oscillating signal generated by an oscillator to a converted signal having a frequency proportionally lower than a frequency of the oscillating signal;

controlling, by the microcontroller, the infrared-link emitter to transmit the converted signal to a calibration device external to the beacon; and in response to receiving an infrared-link signal including frequency adjustment data from the calibration device, adjusting a frequency of the oscillating signal generated by the oscillator based on the frequency adjustment data.

15. The method of claim 12, further including:

in response to detecting an operation of a program control switch, acquiring a signaling code by the microcontroller.

16. The method of claim 12, further including:

processing and verifying data included in the infrared-link signal transmitted from the external beacon; and transmitting a clock reset command to a clock microcontroller of the clock, wherein, upon receiving the clock reset command from the microcontroller, the clock microcontroller waits for a predetermined period of time and restarts a clock cycle period of a clock cycle signal from 0.

17. A beacon system, comprising;

a plurality of beacons for emitting cascading beacon signals with an identical signaling code, wherein each of the beacons includes:

an infrared emitter configured to emit beacon signals;

an infrared-link emitter configured to emit infrared-link signals having a wavelength different from that of the beacon signals emitted by the infrared emitter;

an infrared-link detector configured to detect infrared-link signals;

a memory configured to store a delay time;

a clock configured to generate a clock cycle signal; and a microcontroller configured to, in response to receiving an infrared-link signal including a signaling code and clock synchronization data from an external beacon via the infrared-link detector:

adjust the clock to be synchronized with a clock of the external beacon, according to the clock synchronization data;

store the signaling code in the memory; and when the clock cycle signal generated by the clock indicates that it is a starting time of a clock cycle period, control the infrared emitter to emit a beacon signal including the signaling code with the delay time relative to the starting time of the clock cycle period.

18. The beacon system of claim 17, wherein the delay time of each beacon is different from that of a designated adjacent one of the beacons by a fixed time interval.

19. The beacon system of claim 18, wherein the clock of each of the beacons includes:

an oscillator configured to generate an oscillating signal; and a clock microcontroller coupled to the oscillator and configured to generate the clock cycle signal with the clock cycle period based on the oscillating signal.

20. The beacon system of claim 19, wherein the clock microcontroller is further configured to:

in response to receiving a clock reset command from the microcontroller of the corresponding beacon, wait for a predetermined period of time and restart the clock cycle period of the clock cycle signal from 0.

* * * * *